United States Patent
Allen et al.

(10) Patent No.: US 11,702,594 B2
(45) Date of Patent: Jul. 18, 2023

(54) SOIL STABILISER

(71) Applicant: HALL RB PTY LTD, Parramatta (AU)

(72) Inventors: Louis Allen, New South Wales (AU); Simon Lewer, New South Wales (AU)

(73) Assignee: HALL RB PTY LTD

( * ) Notice: Subject to any disclaimer, the term of this patent is extended or adjusted under 35 U.S.C. 154(b) by 0 days.

(21) Appl. No.: 17/911,782

(22) PCT Filed: Mar. 16, 2021

(86) PCT No.: PCT/AU2021/050233
§ 371 (c)(1),
(2) Date: Sep. 15, 2022

(87) PCT Pub. No.: WO2021/184066
PCT Pub. Date: Sep. 23, 2021

(65) Prior Publication Data
US 2023/0118430 A1   Apr. 20, 2023

(30) Foreign Application Priority Data
Mar. 16, 2020 (AU) ................................ 2020900796

(51) Int. Cl.
*E01C 21/00* (2006.01)
*C09K 17/50* (2006.01)
*E01C 3/04* (2006.01)

(52) U.S. Cl.
CPC ............... *C09K 17/50* (2013.01); *E01C 3/04* (2013.01); *E01C 21/00* (2013.01)

(58) Field of Classification Search
CPC ............ C09K 17/50; E01C 3/04; E01C 21/00
USPC .................................. 404/72–76; 405/302.4
See application file for complete search history.

(56) References Cited

U.S. PATENT DOCUMENTS

| | | | |
|---|---|---|---|
| 8,702,343 B1 | 4/2014 | Vitale et al. | |
| 2002/0025382 A1* | 2/2002 | Hawkins | C09K 17/14 523/132 |
| 2013/0216704 A1 | 8/2013 | Brien | |
| 2014/0140775 A1* | 5/2014 | Vitale | C09K 17/16 405/263 |
| 2020/0024817 A1* | 1/2020 | Huege | E02D 3/12 |
| 2021/0009844 A1* | 1/2021 | Wu | B32B 15/08 |

FOREIGN PATENT DOCUMENTS

| | | |
|---|---|---|
| GB | 575479 A | 2/1946 |
| JP | H08218068 A | 8/1996 |
| SU | 429163 A1 | 5/1974 |

OTHER PUBLICATIONS

Notification of Transmittal of International Preliminary Report of Patentability dated Feb. 10, 2022 in connection with International Applicaition No. PCT/AU2021/050233.
Arguments and Claim Amendments filed on Jan. 13, 2022 in connection with International Applicaition No. PCT/AU2021/050233.
International-type search for provisional patent application No. 2020900796 dated Jan. 27, 2021.
International Search report in International Patent Application No. PCT/AU2021/050233 filed Mar. 16, 2021.
Written Opinion in International Patent Application No. PCT/AU2021/050233 filed Mar. 16, 2021.

* cited by examiner

*Primary Examiner* — Raymond W Addie
(74) *Attorney, Agent, or Firm* — Kim IP Law Group LLC

(57) ABSTRACT

Disclosed herein is a method for stabilising a volume of soil (e.g. a volume of soil that defines a road base or a road sub-base). The method comprises applying a coating agent comprising one or more salts of fatty acids derived from coconut oil to the soil, whereby soil particles in the soil are coated with the coating agent, and then applying to the soil a setting agent comprising a metallic salt that is capable of reacting with the one or more salts of fatty acids derived from coconut oil, whereupon a set product is formed. The soil is subsequently compacted, whereby the coated soil particles are consolidated.

22 Claims, No Drawings

SOIL STABILISER

CROSS-REFERENCE TO RELATED APPLICATIONS

This is a national stage application filed under 35 U.S.C. § 371 of International Patent Application No. PCT/AU2021/050233, filed Mar. 16, 2021, which claims priority to Australian Patent Application No. 2020900796 filed on Mar. 16, 2020.

TECHNICAL FIELD

The present invention relates to methods for stabilising soil and, in particular, soil that is stabilised for a road base or a road sub-base.

BACKGROUND ART

The construction of durable road surfaces relies as much, if not more, on the stability and durability of the road base as on the stability and durability of the surface itself. Numerous techniques have therefore been developed over the years to enhance roads by paying particular attention to the quality of roads' substrates or road base. Methods employing large volumes of imported crushed rock and/or compression of the soil substrate, for example, are frequently used to provide stable and durable road bases.

Such methods, however, involve removing the offending on-site soil and replacing it with superior material, or accepting the on-site soil characteristics and designing the project to compensate accordingly. In either case, the time taken and costs to manufacture such roads are significantly increased due to the presence of non-ideal road base and/or sub-base.

Chemical-based soil stabilisers are known, but their effectiveness outside of the laboratory has tended to limit their utility in many applications, particularly in the construction of durable road bases or sub-bases.

It would be advantageous to provide alternative methods for stabilising a road base.

SUMMARY OF THE INVENTION

In a first aspect, the present invention provides a method for stabilising a volume of soil (e.g. a volume of soil that defines a road base or a road sub-base). The method comprises applying a coating agent comprising one or more salts of fatty acids derived from coconut oil to the soil, whereby soil particles in the soil are coated with the coating agent. Subsequently, a setting agent comprising a metallic salt that is capable of reacting with the one or more salts of fatty acids derived from coconut oil whereupon a set product is formed is applied to the soil, after which the soil is compacted, whereby the coated soil particles are consolidated.

The present invention advantageously provides a chemical process which, when performed on a volume of soil, has the effect of stabilising the soil such that a substantially impervious layer of soil having a high resistance to the ingress of moisture and a support capability strong enough to resist traffic-induced loads is produced. As will be described in further detail below, the inventors have found that the coating agent used in the present invention has physical properties that greatly facilitate its ability to coat soil particles. Furthermore, the reaction products of the coating and setting agents have physical properties that contribute beneficially to the formation of the consolidated and compacted volume of treated soil. The present invention has been successfully trialled by the inventors in numerous real world situations, where the combination of chemical and physical properties achieved by the invention has produced road bases having great strength, durability and water resistance.

At the very least therefore, the present invention provides an alternative to current methods of soil stabilisation. Considerable savings in time and money can be achieved using the method of the present invention instead of conventional mechanical construction as, in general, less equipment and manpower are needed. For example, transportation costs may be reduced because the coating and setting agents may be shipped in concentrated form and diluted on site. The inventors found, for example, that 200 L of a coating agent and 100 L of a setting agent could be used to produce a stabilised volume of soil having a comparable effectiveness to that of a road base prepared using 28 truckloads of crushed rock. The economic and environmental benefits of this are immediately apparent.

The method of the present invention is relatively easy to perform and may be achieved using equipment already likely to be found at construction sites. The inventors also note that, within reason, performance of the invention can be interrupted at any stage without necessarily affecting the resultant stabilised soil. Furthermore, in at least preferred embodiments, both the coating and setting agents are relatively safe, environmentally acceptable and easy to handle. They may preferably be non-toxic, non-hazardous, non-flammable in storage or in use, non-corrosive and generally non-injurious to humans and animals. The coating agent itself is water soluble and biodegradable prior to treatment with the setting agent.

The coating agent comprises one or more salts of fatty acids derived from coconut oil (also referred to as "coconut fatty acids"). In some specific embodiments trialled by the inventors (and described in further detail below), the coating agent may comprise a soap derived from coconut fatty acids. A commercially available coconut fatty acid which has been used by the inventors is characterised as having 48% lauric acid, 16% myristic acid, 4% stearic acid and the balance a mixture of other fatty acids (4-10% caproic acid, 3-12% oleic acid, 3% max linolelaidic acid, 5-13% palmitic acid and 4-8% caprylic acid).

The salts of fatty acids derived from coconut oil have been shown by the inventors to be particularly suitable for use in the present invention, as they have been found to be viscous and tenacious, evenly coating soil particles throughout the volume of soil to which the coating agent has been applied. The aluminium salt thereof is also completely insoluble.

In some embodiments, the one or more salts of the fatty acids may be the sodium and/or potassium salts of the fatty acids. Fatty acid soaps have a lubricity that the inventors believe may contribute significantly to consolidation of the volume of soil, by facilitating movement of the sol particles with respect to each other during compaction. As will be described below, the use of sodium and potassium salts of fatty acids derived from coconut oil has, in some embodiments, been found to provide superior properties for the reagent than if only one salt were used on its own.

The setting agent comprises (or, in some embodiments, consists of) a metallic salt or salts that can react with the one or more salts of coconut fatty acids such that a set product (i.e. which incorporates the soil particles) is ultimately formed. The inventors have found that the reaction between the coating and setting agents (and hence the entrained soil particles) to form a set product does not occur instantaneously, but via an intermediate product having a putty-like consistency. Compaction of the soil during this period squeezes the intermediate product into the interstitial spaces between the soil particles, displacing air and water, where it subsequently sets. The set product has been found by the inventors to have a remarkable hardness, water resistance and durability, both inside and outside of the laboratory. Indeed, the data described below clearly demonstrates the real-world applicability of the present invention.

In some embodiments, the setting agent may comprise an aluminium salt, for example, aluminium sulphate. In embodiments where the coating agent comprises a mixture of the potassium and sodium salts of coconut fatty acid, for example, treating the volume of soil to which the coating agent has been applied with a metallic salt solution renders the coating agent insoluble.

In some embodiments, the coating agent may be provided in a liquid composition that further comprises a dispersing agent. The inventors have found, for example, that the addition of ethylene glycol monostearate further facilitating dispersion of the agent throughout the volume of soil.

In some embodiments, the coating agent may be provided in a liquid composition that further comprises an alcohol, such as 2-propanol, which can help to lower the pour point of the agent and help to prevent it from solidifying during storage.

In some embodiments, the method may further comprise a step in which an additional material or materials is/are mixed into the volume of soil before the setting agent is applied. Typically, the additional material would be mixed into the volume of soil before the coating agent is applied, this being when other physical mixing steps would be likely to take place, although this need not always be the case. The additional material may, for example, be selected from one of more of the following materials: shredded waste plastic, sand, aggregate and crushed glass. As would be appreciated, such embodiments may provide a beneficial use for materials that would otherwise be waste products, or may result in an even more stabilised surface.

In some embodiments, the method may further comprise a step in which lime is added to the volume of soil. Such an addition may further stabilise the soil and improve its mechanical properties (especially with heavy clays).

The present invention may be used with any soil types, and particularly clay soils.

In a second aspect, the present invention provides a kit for stabilising soil, the kit comprising a first container and a second container. The first container contains a coating agent comprising one or more salts of fatty acids derived from coconut oil and which, when applied to a soil, coats soil particles in the soil. The second container contains a setting agent comprising a metallic salt that is capable of reacting with the one or more salts of fatty acids derived from coconut oil and which, when applied to the soil, causes the coated soil particles to consolidate and hence result in the soil stabilisation effect described herein.

In some embodiments, the kit of the second aspect of the present invention may be used in the method of the first aspect of the present invention.

In a third aspect, the present invention provides a composition comprising one or more salts of fatty acids derived from coconut oil, an alcohol and a dispersing agent, when used as the agglomerating agent in the method of the first aspect of the present invention. The one or more salts of fatty acids derived from coconut oil may, in some embodiments be as described herein in the context of the method of the present invention.

In some embodiments, the composition of the third aspect of the present invention may be contained in the first container of the kit of the second aspect of the present invention.

Other aspects, embodiments and advantages of the present invention will be described below.

DESCRIPTION OF EMBODIMENTS

Generally speaking, the present invention relates to soil stabilisation, with particular emphasis on the preparation of soil substrates for road construction. The invention also relates to liquid formulations which are relatively easy to manufacture and inexpensive and which materially assists soil stabilisation for applications such as roadworks.

Thus, the present invention provides a method for stabilising a volume of soil. The method comprises applying a coating agent (described below) to the soil, whereby soil particles in the soil are coated with the coating agent, and then applying to the soil a setting agent (described below) capable of reacting with the coating agent whereupon a set product forms. Finally, the soil is compacted and the coated soil particles are consolidated.

The method of the present invention will be described herein primarily in the context of being used for stabilising a volume of soil that defines (e.g. is to be used as) a road base or a road sub-base. It is to be appreciated, however, that the method may also be used to similar effect in a wide variety of soil treatment and stabilisation situations. For example, the method may be useful in the preparation of sealed parking lots, driveways, airports, airstrips, playgrounds, tennis courts and the like.

Furthermore, the present invention may also be used to stabilise surfaces which are not to be overlaid with paving, but which still require a durability greater than that which can be provided by untreated surfaces. Examples of such surfaces include road shoulders, dirt or "unsealed" outback and service roads, unsealed car parks, unsealed airstrips, intensive cattle feeding lots, rubbish tips, reservoirs, dams, canals, embankments, etc. Indeed, the inventors expect that the present invention will have utility in any situation where soil stabilisation is required or would be beneficial.

As noted above, the present invention provides a method for stabilizing a volume of soil (e.g. a volume of soil that defines a road base or a road sub-base). The method comprises applying a coating agent (e.g. a liquid composition comprising a coating agent) to the soil such that soil particles in the volume of soil to which the agent has been applied are coated by the agent. Subsequently, a setting agent is applied to the soil, the setting agent being capable of reacting with the coating agent, which reactions cause the coated mass of soil particles to harden. Compacting the soil whilst these reactions are underway results in consolidation of the coated soil particles (such that air and water present in the interstitial spaces between the soil particles is displaced) and the ultimate production of a stabilised soil that is suitable for uses including as a road base or sub-base, for example.

The present invention is particularly suitable for use with inferior clay soils, which are converted into hard, water impermeable substrates. The present invention improves the ability of treated soils to resist the influx of capillary rise of water which, if not controlled, causes separation of soil particles and may lead to fluid flow of the particles under pressure. The treated soil has been found to maintain its load bearing capacity even under high-load conditions, even where moisture is present.

The features of the method the present invention and the resultant soil stabilisation effects will be described in further detail below.

Coating Agent

The coating agent comprises one or more salts of fatty acids derived from coconut oil (also referred to herein as "Coconut fatty acids") and may be provided in any form that is capable of coating a significant proportion of the particles of soil in the volume of soil to which the agent is applied. The rheological properties of the coating agent enable it to flow over the soil particles and thus disperse throughout a majority of the volume of soil. The agent also has a tenacity which results in the soil particles retaining a thin coating thereon.

The coating agent must also be capable of reacting with the setting agent in order to set, harden or otherwise produce the functional effects and soil stabilisation described herein. It is primarily the coating agent that reacts with the setting agent in order to cause consolidation of the soil particles.

The coating agent may be provided in liquid or solid form, and in a form that is either ready for application to the soil or in a concentrate form that needs to be diluted or dispersed into a liquid before application.

Fatty acids derived from natural oils tend to comprise a relatively consistent mixture of fatty acids. Whilst coating agents that include only one fatty acid may be effective, the inventors have found that coating agents that include mixtures of fatty acids impart better functionality, such as being more tenacious, more easily handleable and quicker setting.

The coating agent of the present invention comprises one or more salts of fatty acids derived from coconut oil. Such fatty acids comprise a mixture of at least lauric, myristic and stearic acids. Coconut fatty acid has been found to be particularly suitable, as it is free-flowing and relatively tenacious, and its aluminium salt is completely insoluble.

Any salts of the of fatty acids described herein may be used, provided that the utility of the present invention is not adversely affected (e.g. because of solubility or toxicity issues, etc.). Typically, the one or more salts of the fatty acids are the sodium or potassium salts of the fatty acids, these being the salts commonly used in industry (fatty acid salts of sodium or potassium are often referred to as fatty acid soaps). The inventors have found that soaps of Coconut fatty acids impart a lubricity to the volume of soil which, as noted above, may contribute to consolidation of the volume of soil due to it facilitating movement of the sol particles with respect to each other during compaction.

The use of a combination of sodium and potassium salts of some fatty acids may be advantageous in some circumstances and depending on the soil type with which the present invention is to be used. The use of only the sodium soap of coconut fatty acids for example, produces a soap which is relatively soft and which may not as securely hold soil particles for some soil types when compared to a mixture of the sodium and potassium soaps of coconut fatty acids. On the other hand, the potassium soap of coconut fatty acids may to go lumpy when in a concentrated form and may not disperse as well as the mixture of the sodium and potassium soaps of coconut fatty acids. It is within the ability of a person skilled in the art to preform laboratory-based trials using soil samples from a given site in order to determine the most appropriate form of the coating agent.

Typically, the coating agent will form part of a liquid composition that is applied to the volume of soil. Consistent with typical industry practice, such a liquid composition is often referred to as a "Part A" liquid composition (with the setting agent being the "Part B" composition). In such embodiments, the liquid composition may either consist of or comprise the coating agent, optionally in combination with other components that may impart advantageous functionality to the composition.

In such embodiments, the proportion of the salt(s) of fatty acid(s) in the liquid composition may range from as low as about 10% (w/w) up to about 100% (w/w). In some embodiments, for example, the fatty acid salts may comprise about 10%, 20%, 30%, 40%, 50%, 60%, 70%, 80%, 90% or 100% (w/w) of the liquid composition. Typically, the fatty acid salts comprise between 10-30% of the liquid composition, for example between 15-25% or between 17-22%. In such embodiments, the proportion of the fatty acid salts in the liquid composition may be about 15%, 16%, 17%, 18%, 19%, 20%, 21% or 22% (w/w) of the liquid composition.

As noted above, the Part A liquid composition comprising the coating agent may also include additional components, provided that such components do not adversely affect the coating agent's functionality.

In some embodiments, the Part A liquid composition may further comprise an alcohol. Adding an alcohol to the coating agent may provide beneficial rheological effects such as lowering the pour point of the agent and preventing it from solidifying during storage. Suitable alcohols include 2-propanol and ethanol. When present, the proportion of the alcohol in the Part A liquid composition may range from as low as about 1% (v/v) up to about 3% (v/v). In some embodiments, for example, the liquid composition may include about 1%, 1.5%, 2%, 2.5% or 3% (v/v) of an alcohol.

In some embodiments, the Part A liquid composition may further comprise a dispersing agent. Adding a dispersing agent may provide beneficial effects such as more effectively dispersing the coating agent into the volume of soil being treated. Suitable dispersing agents include ethylene glycol monostearate, alcohol ethoxylates and sorbitan monostearate, for example. When present, the proportion of the dispersing agent in the Part A liquid composition may range from as low as about 1% (v/v) up to about 4% (v/v). In some embodiments, for example, the liquid composition may include about 1%, 1.5%, 2%, 2.5%, 3%, 3.5% or 4% (v/v) of a dispersing agent.

Setting Agent

The setting agent is capable of reacting with the coating agent in a manner whereby soil particles coated with the coating agent are ultimately caused to become consolidated due to them having been compressed and becoming set. The setting agent is provided in a form, amount and in conditions where it is caused to react with the coating agent to produce a solidified product around the coated soil particles such that the soil particles are consolidated. Subsequent compaction of the soil results in the soil stabilisation effects described herein.

The setting agent comprises a metallic salt that can react with the one or more salts of fatty acids described above, such that a stabilized mass including the soil particles is formed. Metallic salts found by the inventors to be highly effective when the setting agent comprises soaps of fatty acids derived from coconut oil, for example, are aluminium salts and, in particular, aluminium sulphate (which is readily available, relatively cheap and environmentally friendly, as well as being highly soluble).

The setting agent is typically provided in the form of a "Part B" liquid composition and separately applied to the soil (as will be described in further detail below). The setting agent needs to be stored separately from the coating agent, in order to preclude premature reactions. If the same equipment is used to apply the two agents, then care must be taken to wash down the equipment thoroughly. The concentration of the setting agent in the Part B liquid would usually be selected such that simple volume ratios of Part A: Part B are to be applied on site (e.g. 2 parts "Part A" and 1 part "Part B").

Again, the setting agent may be provided in a concentrated liquid or solid form, ready for dilution and application to the soil.

Additional Materials

In some embodiments, it may be advantageous to incorporate an additional material or materials (reactive or non-reactive) into the method of the present invention, if such would provide a beneficial effect and not deleteriously affect performance of the invention.

Such soil may have an enhanced strength or other property (e.g. water resistance), increased bulk and/or frictional properties. However, a benefit of incorporating an additional material into the soil may simply be that a product otherwise intended to go to landfill may be beneficially re-purposed. Examples of additional material include shredded waste plastic, sand, aggregate and crushed glass.

The additional material(s) may, for example, be mixed into the volume of soil before the setting agent is applied in order to become incorporated into the soil. The additional material would, however, typically be mixed into the volume of soil before the coating agent is applied in order to ensure that the subsequently applied coating agent is evenly dispersed throughout the volume of the soil.

In some embodiments, lime may be added to the volume of soil in order to help further stabilise the soil and improve its mechanical properties (especially with heavy clays).

Applying a Liquid Composition Comprising a Coating Agent to the Soil

In an embodiment of the method of the present invention, a "Part A" liquid composition comprising coating agent may, for example, be applied to the soil such that soil particles in the soil are coated with the coating agent.

The Part A liquid composition may be applied to the soil in any manner effective to contact the coating agent with the soil particles. Given the nature of construction sites and the currently available equipment, spraying the composition on top of the soil is the method currently envisaged by the inventors to be most practical.

The inventors note that suitable equipment for spraying the Part A composition (and indeed, the setting agent) are water dollies (preferably equipped with a pump), which are able to evenly distribute liquids over a surface as a spray. In use, sufficient water would be placed in the water dolly and the coating agent (etc.) added in the amount determined by the laboratory tests (described below) relevant to the on-site soil. Water is then added to make up the Part A composition (the water must be free of salts, acids and organic matter to prevent contamination or premature reactions). After mixing in the dolly, the liquid is sprayed onto the top surface of the soil as evenly as possible. Spraying should ideally be from the edges towards the centre and it should be carried out until a reasonably even coverage is attained.

The Part A composition may be applied to the soil "as is" or the volume of soil may be disturbed before the composition is applied. In road base construction, for example, the inventors envisage that the soil to be treated would firstly be tined or loosened, and then sprayed with the Part A composition. In order to tear up or rip an existing road base prior to treatment, a motor grader fitted with scarifier and blade may, for example, be used. In some embodiments, the area to be treated may be graded to the correct line and level as required by the project, after which the soil is scarified and pulverised.

Once applied, the Part A composition may be allowed to simply sink into the volume of soil or, alternatively, the composition may be physically mixed into the volume of soil. Such mixing would ensure a more even distribution of the coating agent (and any other components) throughout the entirety of the volume of soil, which may be beneficial. Again, in a road construction environment, a pulveriser/mixer (e.g. a Pulvimixer) or other suitable pulverising equipment (e.g. disc ploughs) may be used to mix the coating agent (and setting agent) into the soil after spraying.

In embodiments where the coating agent (or setting agent) is provided in a solid form or as a concentrate, the method would also involve the step of mixing the coating agent into a volume of water (i.e. in order to produce the Part A composition) before its application to the soil.

Applying a Liquid Composition Comprising a Setting Agent

In the method of the present invention, a setting agent is applied to the coated soil particles, which ultimately causes the soil particles to set into a hardened mass.

Similar to that described above for the coating agent, the setting agent may be sprayed onto the top of the volume of soil and subsequently physically mixed into the volume of soil. Such an application ensures substantial homogeneity throughout the volume of soil, and consequently consistent structural properties.

In a specific embodiment, for example, a solution may be prepared in another dolly by adding the setting agent to a predetermined volume of water (calculated from the laboratory studies described below, for example). The "Part B" liquid composition containing the setting agent is then applied to the soil as evenly as possible. In case this dolly is the same one as used for the application of the coating agent, it must be carefully washed out between using it for each solution to avoid chemical reaction between them, which would result in plugging of the spray nozzles. The pulvimixer may then again used to blend the setting agent into the soil/stabilising reagent mix.

A final moisture content check of the soil may then be made. If the moisture content is high the soil may be aerated, whilst if it is low, water may be added. Conveniently, the water added may be in the form of further Part B solution, since an excess of the setting agent is not harmful and would ensure that all of the coating agent is effectively treated.

The method further comprises compacting the volume of soil after the setting agent has been applied to the coated soil particles. Such a compaction may be accomplished using any suitable equipment. Sheepsfoot rollers of various weights, either static or vibratory, may for example be used to compact the soil prior to final grading. Final smoothing may be accomplished by means of a rubber tyred roller. A tyred tractor with adequate power to receive and actuate any non-automated equipment is highly recommended.

When performed, the rolling operation should start along the edges and progress longitudinally, each pass working parallel and closing towards the centre on straight stretches and from the inner to the outer edges in the curved stretches, so that the roller covers evenly, in each pass, at least half the width of its previous pass parallel to the road axis. In areas where access for rolling is not possible, or in which the use of rollers is not advisable, compact ion should be achieved by means of special rammers.

The finished layer should be even and free of bumps, depressions or ruts. If these conditions are not met, the road surface may be re-scarified, pulverised, humidified and re-rolled. Reworking of soils in this manner may in fact be undertaken at any time provided that adequate consideration is given to pulverising, humidifying and rolling as previously discussed.

Final surface finishing should be carried out using a motor grader, working in cutting operation only, without allowing any loose material or small build-ups to remain. Rolling is completed with a rubber tyred roller. For the purpose of minimising abrasive action to the completed road surface it is recommended that a suitable wearing course (i.e. a finishing layer) be applied as required.

Soil Pre-Testing and Evaluation

Soil stabilisation using the present invention results in an enhancement of the soil's existing properties so as to create a new site material capable of better meeting the requirements of a road base or sub-base. However, before being applied at a particular site, testing should be undertaken to determine the required treatment ratios.

Without wishing to be bound by theory, the inventors expect that improved engineering characteristics occur due to the cationicity of the reagents electrostatically binding with the anionicity of soil particles, resulting in the consolidation of particles (especially clay particles) in the soil. In effect, the clay particles flocculate and agglomerate and they "clump" together or agglomerate into larger aggregations. In light of this, the proportions of clay, silts, sands and gravels in the soil to be treated should be considered before performing the method of the present invention.

Cohesion shrinkage, swelling and compressibility of soils are mainly associated with the quantity and properties of the clay fraction, as indicated by the Atterburg limits and maximum dry compressive strength. The Atterburg limits provide the ranges of moisture in which the material acts as a solid, semi solid or fluid. The optimal ratio for addition of the coating and setting agents may therefore be based on particle size distribution (ratio of clay to silts) and the Atterburg limit criteria.

Thus, before performing the present invention on a volume of soil, it would usually be necessary to characterise the soil itself. A soil survey provides information on the location and distribution of the soil types and the moisture environment existing in the soil at a work site. Representative samples of each soil type may be gathered for laboratory testing, with their profiles being prepared using standard soil procedures. Sufficient samples should be taken to characterise the engineering properties adequately for each level of the soil profile.

An exemplary procedure would involve classification tests such as particle size distribution, plastic limit and liquid limit (i.e., the Atterburg limits) and resistance to loads (e.g. California Bearing Ratio (CBR)), as well as establishing moisture density relationships using the Proctor Test. In the Proctor test, the maximum dry density and the optimum moisture content of the natural soil material are obtained. Other test procedures such as the Texas' Triaxial may be useful to characterise the material.

Also, tests to determine such values as the pH, salinity and organic matter content may be useful to detect the presence of deleterious constituents, if such is necessary.

Furthermore, samples of soils that have been treated in accordance with the method of the invention may also be tested in order to provide a measure of the soils' improved load resistance, water resistance or other enhanced property. Strength tests (such as CBR or Texas Triaxial) may be carried out to verify that the required improvement has been achieved. The California Bearing Ratio (CBR), in particular, is a test well known in the art and which is commonly used as a measure of the resistance of a material to penetration.

Prior to carrying out proposed routine quantitative tests, it may also be deemed appropriate to perform a qualitative evaluation of the effectiveness of the coating and/or setting agent in order to ascertain the minimum dosage rates. This can be effectively carried out by moulding both untreated and treated materials in a Proctor type compaction mould, allowing the specimens to dry for 24 hours and then placing them in about 25 mm of water.

For example, in the modified Proctor test, soil samples may be treated with varying percentages of coating and setting agents and then compacted into cylindrical shapes. Together with an untreated sample, these are then placed in a dish of water. In a typical test, the untreated sample quickly becomes saturated and slumps to the bottom of the dish of water.

The stability of the treated samples may also be used to determine the correct proportions of the additives. For example, a satisfactory result is achieved when the test specimen remains stable, shows some resistance to being broken and has internal moisture content around the optimum. When the test samples are placed in water, the resulting capillary rise and any softening, swelling, cracking or sample deterioration of any sort should be compared.

It should be noted that where the soils have a high clay concentration, they may be difficult to mix, and higher quantities of the coating agent (and correspondingly the setting agent) may be required for an appreciable change in properties. In practice, for example, it may not be possible to stabilise clay soils having a liquid limit greater than about 50, using the coating and setting agents alone. It should, however, be possible to stabilise such heavy clays after pre-treatment (modification) with calcium slurry and, in some embodiments therefore, the present invention may include an appropriate pre-treatment or soil conditioning step which may, for example, reduce the soil's plasticity and render the soil more workable.

In readiness for applying the method of the present invention on site, the natural moisture level at selected spots should be determined. This may be done by means of the Speedy Test or with other appropriate testing equipment. The amount of water to be added expressed as a percentage may then be determined, based on the previously conducted laboratory studies (Proctor Test), by subtracting the natural moisture content from the optimum.

The total volume of soil to be treated may be determined from site calculations allowing for the intended depth of treatment. The total mass of dry soil is then calculated, based on the total volume and maximum dry apparent specific gravity, as provided by means of the Proctor Test. The total quantity of the Part A and B solutions of coating and setting agents to be added may then be determined utilising the difference between optimum moisture content and natural moisture content and then multiplying that figure by the total mass of soil to be treated as determined above. This may be conveniently expressed by the following formula:

$$\text{Total amount of water required} = 10^3 (D \times T)[(R-M)/100] \text{ litres/sq. m}$$

Where:
D=Density of soil in tonnes per cubic metre
T=Pavement thickness in metres
R=Optimum moisture content expressed as a percentage
M=Percentage moisture content of soil (field test)

When the quantity of total water to be added is thus obtained it is preferably divided into two portions in the ratio of 60:40. The first portion is a vehicle for the addition of the coating (i.e. Part A) agent, whilst the second is for the addition of the setting (i.e. Part B) agent.

The quantity of concentrated coating agent and setting agent (e.g. as a granulated salt) to be added to each respective portion are determined from the laboratory analysis as follows:

$$\text{Quantity of coating agent} = 10^3 (D \times T)[C/100] \text{ litres/sq. m}$$

Where:
C=Percentage add-on of concentrated coating agent/setting agent required from laboratory report
D=Density of soil in tonnes per cubic metre
T=Pavement thickness in metres An amount of setting agent equal to about 20% of the equivalent weight of the coating agent has been found to be effective.

A specific embodiment of the present invention will be described for illustrative purposes below. The exemplified method utilises a Part A liquid that includes a coating agent referred to by the inventors as "CB230419", which is a coconut fatty acid sourced from suppliers such as Redox Chemicals and which includes lauric acid, myristic acid and stearic acid as major components. A fatty acid soap may then be produced in the Part A liquid by mixing the coconut fatty acid with an alkali (sodium hydroxide and potassium hydroxide, in these examples) with a dispersant and alcohol, as described below.

This coating agent contained in the Part A liquid may be poured or sprayed directly over the soil substrate. After treatment with the Part B solution that includes a setting agent in the form of aluminium sulphate (which reacts with the soap in Part A to create an insoluble aluminium soap), the resultant putty-like composition has the effect of stabilising the soil substrate and, once compacted and consolidated, making it impervious to leaching, thereby effectively providing a stable waterproof layer beneath the (subsequently constructed) road surface. Such treatment consolidates and protects the grains or particles that constitute the soil from the detrimental effects of water.

The treated layer of soil acquires a support capability strong enough to resist traffic-induced loads by reducing soil expansion and by increasing the load bearing capacity thereof. Most importantly, the inventors have found that these properties do not change with time.

The compositions and methods for forming two illustrative Part A formulations are shown below in Table 1:

TABLE 1

Part A formulations

| Raw Material | Formulation 1 % | Formulation 2 % |
|---|---|---|
| Tap Water | 71.7 | 73.6 |
| Fatty Acid (CB230419) | 22.0 | 20.0 |
| Sodium Hydroxide (50%) | 1.5 | 1.5 |
| Potassium Hydroxide (tech. flake) | 2.6 | 2.7 |
| Ethylene Glycol Monostearate (EGMS) | 1.0 | 1.0 |
| 2-Propanol | 1.2 | 1.2 |
| Total | 100.00 | 100.00 |

Process Steps
1. Heat coconut fatty acid to 60-65 degC and hold at that temperature until charged
2. Add water to clean vessel
3. mix at slow speed
4. Add sodium hydroxide slowly
5. Add potassium hydroxide slowly
6. Mix for 5 minutes or until all fully dissolved and solution is clear
7. Ensure vessel contents are at 50-90 degC (e.g. 85-87 degC)
8. Add coconut fatty acid slowly to the vessel
9. Adjust temperature to 85-87 degC if required with slow mixing
10. Maintain temperature at 85-87 degC for 30 minutes ensuring the mixture is homogenous.
11. Add EGMS
12. Mix for 15 minutes
13. Ensure mixture is homogenous
14. Measure pH as per ASTM D460 and adjust to 8.5 to 9.0 with 50% sodium hydroxide if required
15. Sample and titrate with 0.1M HCl as per ASTM D460
16. Keep mixing and cool the mixture to 30 degC
17. Add dye (if required—e.g. to visually indicate where the Part A composition has been applied)
18. Add 2-propanol
19. Mix for 10 minutes
20. Sample to ensure the mixture is homogenous.

Where necessary, the pH may be adjusted in the range 8.5 to 9.0, by the addition of further sodium hydroxide, suitably in the form of a 50% solution. A suitable dye is Brilliant Blue FCF Supra at about 0.001% w/w.

The characteristics of a concentrated Part A liquid formulation that includes a coating agent manufactured according to the above method is as follows:

| | |
|---|---|
| pH at 20° C. | 8.5-9.0 |
| Appearance | Pearlescent liquid |
| Density, kg/Lat 20° C. | 1.015 Typical |
| Viscosity (Ford cup No 4) at 45° C. | 10 to 13 seconds |
| Solubility in water | Total |
| Solubility in ethyl alcohol | Insoluble (1% max) |
| Superficial tension in 0.5% solution | 31.7 dynes/cm |
| Test with $Al_2(SO_4)_3$ Solution (setting agent:$Al_2(SO_4)_3$:$H_2O$ = 1:1:1) | Precipitate forms |

The present invention also relates to a kit for stabilizing soil, the kit comprising a first container and a second container, in which:
the first container contains a coating agent comprising one or more salts of fatty acids derived from coconut oil and which, when applied to a soil, coats soil particles in the soil; and
the second container contains a setting agent comprising a metallic salt that is capable of reacting with the one or more salts of fatty acids derived from coconut oil and which, when applied to the coted soil particles, causes the coated soil particles to consolidate.

The present invention also relates to a composition comprising one or more salts of fatty acids derived from coconut oil, an alcohol and a dispersing agent, when used in the methods of the present invention described herein. The one or more salts of fatty acids, alcohol and dispersing agent may, for example, be those described above in the context of the method of the present invention. The composition may, for example, be used as the coating agent in the method described above.

Described herein is a process for stabilising soils for construction of roadways and the like, in which a stabilising reagent comprising a soluble soap of a fatty acid or natural oil is applied to the soil (where no paving is utilised) or to the soil substrate (prior to laying the road surface where required). The stabilising reagent is then treated in situ with a neutralising solution comprising a metallic salt to render it insoluble.

EXAMPLES

Examples of specific embodiments in accordance with the present invention will now be described.

Example 1

The following examples illustrate various formulations for the concentrated Part A liquid according to the invention. In all embodiments, the Part B liquid formulation included aluminium sulphate.

| COMPONENT | | | | | | |
|---|---|---|---|---|---|---|
| | EXAMPLE FORMULATIONS | | | | | |
| | A | B | C | D | E | F |
| | Percentage by Weight | | | | | |
| Water | 79.6 | 75.41 | 75.59 | 76.0 | 75.55 | 76.35 |
| NaOH (50% soln) | 1.2 | 7.16 | 3.00 | 6.0 | 1.50 | — |
| KOH (solid) | — | 2.62 | 2.60 | — | 2.65 | 4.84 |
| Coconut fatty acid | 17.0 | 17.82 | 17.82 | 17.0 | 18.10 | 17.82 |
| EGMS | 1.0 | 0.99 | 0.99 | 1.0 | 1.00 | |
| 2-Propanol | 1.2 | — | — | — | 1.20 | — |
| Dye | | | | | 0.0001 | |

| APPEARANCE | |
|---|---|
| Formulation | Appearance |
| A: | Fluid pH 5.8 (addition of 0.8% NaOH caused gelling) |
| B: | Non-pearlescent fluid |
| C: | Milky fluid |
| D: | Milky fluid |
| E: | Pearlescent fluid |
| F: | Fluid |

A concentrated liquid road base stabilising reagent having Formulation E and manufactured according to the above process steps has been tested using a variety of standard procedures on a wide range of Australian soil samples. 5 kg samples of soil were obtained from various sites throughout Australia. The results of some of these laboratory tests are provided below:

| EXPERIMENT 2 Sample: Sandy Loan | | |
|---|---|---|
| | Untreated | Treated |
| Coating agent % | | 0.1 |
| Setting agent % | | .02 |
| Calcium Slurry | | .06 |
| Optimum moisture content % | 22.5 | 22.5 |
| Dry density t/m$^3$ | 1.54 | 1.42 |
| Moisture at moulding % | 254.0 | 29.6 |
| California Bearing Ratio | 8 | 60 |

| EXPERIMENT 3 Sample: Brewarrina Soil | | |
|---|---|---|
| | Untreated | Treated |
| Coating agent % | | 0.1 |
| Setting agent % | | .02 |
| Calcium Slurry | | .06 |
| Optimum moisture content % | 22.5 | 22.5 |
| Dry density t/m$^3$ | 1.54 | 1.42 |
| Moisture at moulding % | 25.0 | 29.6 |
| California Bearing Ratio | 8 | 60 |

| EXPERIMENT 3 Sample: Bourke Soil | | |
|---|---|---|
| | Untreated | Treated |
| Coating agent % | | 0.1 |
| Setting agent % | | .05 |
| Calcium Slurry | | .06 |
| Optimum moisture content % | 21.6 | 21.6 |
| Dry density t/m$^3$ | 1.54 | 1.52 |
| Moisture at moulding % | 23.6 | 25.8 |
| California Bearing Ratio | 9 | 73 |

| EXPERIMENT 4 Sample: Windsor Soil | | |
|---|---|---|
| | Untreated | Treated |
| Coating agent % | | 0.1 |
| Setting agent % | | .01 |
| Calcium Slurry | | .04 |
| Optimum moisture content % | 18.0 | 18.0 |
| Dry density t/m$^3$ | 1.65 | 1.65 |
| Moisture at moulding % | 19.9 | 20.7 |
| California Bearing Ratio | 5 | 45 |

| EXPERIMENT 5 Sample: Batemans Bay Soil | | |
|---|---|---|
| | Untreated | Treated |
| Coating agent % | | 0.1 |
| Setting agent % | | .05 |
| Calcium Slurry | | .06 |
| Optimum moisture content % | 12.0 | 12.0 |
| Dry density t/m$^3$ | 1.92 | 1.92 |
| Moisture at moulding % | 11.8 | 11.5 |
| California Bearing Ratio | 6 | 69 |

In each case, it will be seen that a satisfactory stabilisation of the soil occurred as measured by the soil's CBR, which is well above the soil's natural stability and of a value that is suitable for road bases.

Example 2

A field trial was conducted on an unsealed road base in the Sydney, Australia region. A Part A composition having a coating agent in the form of Formulation 2 set out above in Table 1, diluted in water, and a Part B composition comprising aluminium sulphate dissolved in water were applied to the road base in the manner described above and left for 3 days, during which fairly constant rain was experienced.

Three portions of the road base (the left and right sides as well as the middle of the road) were then tested using the standard cone penetrometer test (CPT), which provides an indication of the relative strength and stability of a surface. The penetrometer results are shown below in Table 2.

TABLE 2

CPT results

| Penetrometer Depth (mm) | Treated road (left edge) | Treated road (right edge) | Treated road (centre) | Untreated road |
|---|---|---|---|---|
| 150 mm | 8 | 12 | 13 | 6 |
| 300 mm | 10 | 26 | 22 | 6 |
| 450 mm | 7 | 19 | 11 | 7 |
| 600 mm | 15 | 17 | 16 | 6 |
| 750 mm | 11 | 15 | 15 | 5 |
| 900 mm | 13 | 15 | 18 | 4 |
| 1050 mm | 15 | 15 | 17 | 6 |

As can be seen, the centre and right hand side of the road treated in accordance with the present invention showed very similar strengths through the treated depths and also below. The left hand side of the road was weaker in the treated depth and the inventors suspect that this side was most likely was not treated as optimally as the centre and opposite side of the road.

The data in Table 2 clearly demonstrates that the road base treated in accordance with the present invention has a significant strength increase over the negative control (i.e. the untreated road). Specifically, at a 150 mm depth, the properly treated areas of the road showed a 100% strength improvement over the untreated road, at a 300 mm depth, the properly treated areas of the road showed a 400% strength improvement over the untreated road and, at the depths greater than 300 mm, the properly treated areas of the road showed between 200-300% strength improvement over the untreated road.

As noted above, this test was run after 3 days of fairly constant rain, which tested the water resistance of the road base prepared in accordance with the present invention, with the impact of that resistance on road strength being clearly seen in the data.

Embodiments of the present invention provide methods for stabilizing a volume of soil, and may have one or more of the following advantages:

Considerable savings in time and money can be achieved by utilizing the method of the present invention. Generally speaking, less equipment and manpower are needed. The process is easy to apply.

The waterproofness of the stabilised soil results in an improved longevity of road bases, especially in high rainfall areas.

Reduction in road slip (liquefaction) in sandy soil bases.

Work can be interrupted at many stages without affecting the final result. The treated layer can be removed and replaced if circumstances require.

The products utilised are generally safe, environmentally acceptable and easy to handle. They are generally non-toxic, non-hazardous, non-flammable in storage or in use, non-corrosive and generally non-injurious to humans and animals. The coating agent itself may also be water soluble and biodegradable prior to treatment with the setting agent.

Transportation costs are minimised as the agents can be shipped in concentrated form and diluted on site.

It will be understood to persons skilled in the art of the invention that many modifications may be made without departing from the spirit and scope of the invention.

It is to be understood that any prior art publication referred to herein does not constitute an admission that the publication forms part of the common general knowledge in the art.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method for stabilising a volume of soil, the method comprising:
   applying a coating agent comprising salts of fatty acids derived from coconut oil to the soil, wherein the salts of fatty acids derived from coconut oil comprises a mixture of salts of lauric, myristic and stearic acids and whereby soil particles in the soil are coated with the coating agent;
   applying to the soil a setting agent comprising a metallic salt that is capable of reacting with the salts of fatty acids derived from coconut oil, whereupon a set product is formed; and
   compacting the soil, whereby the coated soil particles are consolidated.

2. The method of claim 1, wherein the volume of soil is disturbed before the coating agent is applied.

3. The method of claim 1, wherein the coating agent is sprayed onto the top of the volume of soil.

4. The method of claim 1, wherein the coating agent is physically mixed into the volume of soil.

5. The method of claim 1, wherein the coating agent is mixed into a volume of water before its application to the soil.

6. The method of claim 1, wherein the setting agent is sprayed onto the top of the volume of soil.

7. The method of claim 1, wherein the setting agent is physically mixed into the volume of soil.

8. The method of claim 1, wherein the setting agent is mixed into a volume of water before its application to the soil.

9. The method of claim 1, wherein the soil comprises clay.

10. The method of claim 1, wherein the salts of fatty acids derived from coconut oil are the sodium and/or potassium salts of the fatty acids.

11. The method of claim 1, wherein the coating agent is provided in a liquid composition that further comprises an alcohol.

12. The method of claim 11, wherein the alcohol is 2-propanol.

13. The method of claim 1, wherein the coating agent is provided in a liquid composition that further comprises a dispersing agent.

14. The method of claim 13, wherein the dispersing agent is ethylene glycol monostearate.

15. The method of claim 1, wherein the setting agent comprises an aluminium salt.

16. The method of claim 15, wherein the setting agent comprises aluminium sulphate.

17. The method of claim 1, further comprising mixing an additional material into the volume of soil before the setting agent is applied.

18. The method of claim 17, wherein the additional material is mixed into the volume of soil before the coating agent is applied.

19. The method of claim 17, wherein the additional material is selected from of the following materials: shredded waste plastic, sand, aggregate and crushed glass.

20. The method of claim 1, further comprising adding lime to the volume of soil.

21. The method of claim 1, wherein the stabilised volume of soil defines a road base or a road sub-base.

22. A kit for stabilizing soil, the kit comprising a first container and a second container,
   the first container containing a coating agent comprising salts of fatty acids derived from coconut oil, wherein the salts of fatty acids derived from coconut oil comprises a mixture of salts of lauric, myristic and stearic acids, and which, when applied to a soil, coats soil particles in the soil; and
   the second container containing a setting agent comprising a metallic salt that is capable of reacting with the salts of fatty acids derived from coconut oil and which, when applied to the soil, causes the coated soil particles to consolidate.

* * * * *